United States Patent [19]

St. Jean

[11] Patent Number: 5,263,503

[45] Date of Patent: Nov. 23, 1993

[54] FILTER CARTRIDGE CLEANING MECHANISM

[76] Inventor: Robert L. St. Jean, P.O. Box 1079, East Hampstead, N.H. 03826

[21] Appl. No.: 991,175

[22] Filed: Dec. 15, 1992

[51] Int. Cl.⁵ .......................... B08B 3/04; B08B 9/00
[52] U.S. Cl. ...................... 134/166 R; 134/182; 134/900
[58] Field of Search .............. 134/900, 149, 166 R, 134/166 C, 182, 183; 68/189, 198; 210/275, 409, 411

[56] References Cited

U.S. PATENT DOCUMENTS

| | | | |
|---|---|---|---|
| 1,793,736 | 2/1931 | Dunlap | 68/198 |
| 2,637,993 | 5/1953 | Stienen | 68/198 |
| 3,413,988 | 12/1968 | Butler | 134/166 R X |
| 4,299,699 | 11/1981 | Boogay | 210/411 X |
| 4,935,126 | 6/1990 | Drori | 210/411 X |

*Primary Examiner*—Philip R. Coe
*Attorney, Agent, or Firm*—Frederick R. Cantor

[57] ABSTRACT

A cleaning mechanism for a filter cartridge is described, which includes a tubular flow duct, having a series of flow ports, spaced along its length. One end of the flow duct is closed, while the other, open end of the flow duct, has a hose coupling, that can be screwed onto a conventional hose, so that pressurized water, or other cleaning liquid, can be admitted to the flow duct. An annular filter cartridge, is mounted on the flow duct, between two circular disks carried at opposite ends of the flow duct. One of these disks, is removable from the flow duct, in order to permit the filter cartridge, to be installed onto the flow duct, or removed from the flow duct. When a pressurized cleaning liquid is admitted to the flow duct, the liquid pressure forces the liquid radially outwardly, through the filter cartridge, so as to dislodge contaminants from the annular filter body.

4 Claims, 2 Drawing Sheets

FILTER CARTRIDGE CLEANING MECHANISM

BACKGROUND OF THE PRESENT INVENTION

The present invention, relates to filter cartridge cleaning mechanisms.

The present invention, also relates to a manual mechanism, for cleaning a contaminated filter.

The present invention, more particularly, relates to a mechanism for cleaning filter cartridges, that are used in conjunction with water wells.

Water wells are usually equipped with removable filter cartridges, for trapping dirt, and other contaminants, in the cartridge, thereby preventing the contaminants from being carried along with the water, being pumped into the household water supply system. Such filter cartridges commonly last only a few months, before becoming sufficiently plugged with contaminants, so as to produce an unacceptably high resistance to satisfactory water flow.

The present invention is concerned with a relatively low cost mechanism for periodically cleaning a water filter cartridge, such that the cartridge can then be reused in a water well, for a prolonged operating period, i.e., several years.

I am unaware of any prior art devices that are specifically designed for cleaning well water filter cartridges. U.S. Pat. No. 3,566,892, granted to Russell Logue and John Williams, on Mar. 2, 1971, discloses an apparatus for cleaning an oil filter cartridge. The apparatus comprises an upright housing, sub-divided into three compartments by two horizontal partitions. One of these partitions comprises a porous screen, for filtering oil sludge from a cleaning solvent, as it drains from the uppermost compartment. The oil-contaminated cartridge, is supported on a horizontal plate in the uppermost compartment, and a vertical tube extends from the lower-most compartment, upwardly through the horizontal plate, to serve as a stationary spindle for the filter cartridge.

The cleaning operation, involves the introduction of compressed air into the lower compartment, whereby cleaning solution in the lower compartment is pumped upwardly through the vertical tube and into the filter cartridge via a series of small ports spaced along the tube. The used sludge laden solvent drains out of the upper most compartment, through a porous screen, or partition, that forms the upper wall of the middle compartment. Eventually, the solvent solution is returned to the lower compartment, for reuse.

A principal disadvantage of the apparatus shown in U.S. Pat. No. 3,566,892, is a relatively high manufacturing cost. Also the apparatus requires a compressed air source, e.g., an air compressor, in order to be operational.

U.S Pat. No. 3,820,552 issued to Robert Lang and Robert Carnot, on Jun. 28, 1974, discloses an apparatus for cleaning filter cartridges used in swimming pool filtration systems. The apparatus includes a double-walled tubular shell having a manual valve at one end, whereby pressurized water can be supplied to the annular space between the inner and outer shell walls. Holes extend through the inner shell wall so that the pressurized water can impinge against the outer surface of a filter cartridge, placed within the tubular shell. The tubular shell, can be raised, or lowered, to vary the flushing action against different zones along the cartridge surface.

One possible disadvantage of the apparatus disclosed in U.S. Pat. No. 3,820,552, is the fact that the pressurized water tends to force the contaminants into the filter body, i.e., toward the cartridge axis, such that, at least some of the contaminants beneath the outer surface of the filter cartridge, will be driven further into the cartridge filter media, instead of being expelled from the cartridge.

U.S. Pat. No. 4,417,596, granted to Bo Pahlen, on November 29, 1983, discloses a swimming pool filter cleaning apparatus that is similar, in many respects, to the apparatus shown in the above-noted U.S. Pat. No. 3,820,552. However, in this case, the filter cartridge is provided with an elongated handle, whereby the cartridge can be moved back and forth within a hollow stationary shell. The hollow shell has a ring of internal holes at one end, so that while the filter cartridge is moving back and forth within the shell, pressurized water is being sprayed against a localized area of the cartridge outer surface. The apparatus of U.S. Pat. No. 4,417,596, appears to have the same disadvantages as the apparatus of U.S. Pat. No. 3,820,552.

U.S. Pat. No. 3,665,547, issued to John Boylan, on May 30, 1972, shows an apparatus for blowing contaminants out of an engine air cleaner. The apparatus comprises a compressed air tank, having a vertical flow passage in its bottom wall. An annular shield is attached to the lower end of the flow passage, so that when the apparatus is placed over an air cleaner, compressed air can be discharged from the tank, through the vertical passage, thereby exerting a reverse pressure on the filter media. The apparatus of U.S. Pat. No. 3,665,547, requires an air compressor, or other air pressure source. Another possible disadvantage of the patented apparatus, is that the it is rather bulky and difficult to handle, especially since the apparatus must be manually held in a specific position, resting on an end surface of the air cleaner, while a manual valve is being opened to direct the blast of compressed air into the central chamber of the air cleaner.

SUMMARY OF THE PRESENT INVENTION

An object of the present invention, is to provide a filter cartridge cleaning mechanism.

Another object of the present invention, is to provide a manual mechanism for cleaning a contaminated filter.

A further object of the present invention, is to provide a mechanism for cleaning filter cartridges, that are used in conjunction with water wells.

The present invention contemplates a portable low-cost mechanism for cleaning a filter cartridge, e.g., an elongated tubular cartridge usable in well water filtration systems. In one form of the invention, the cleaning mechanism comprises a tubular flow duct, having a circular disk attached thereto at one end, while the other end of the tubular duct is threaded, to removably receive a second circular disk. An annular filter cartridge can be telescoped onto the tubular flow duct, after which the second circular disk can be threaded onto the threaded end of the flow duct, whereby the filter cartridge is then clamped between the two disks.

A hose coupling has a swivel fit on the tubular flow duct, such that a hose can be coupled to the flow duct, for supplying pressurized water, or other cleaning solution to the flow duct. Flow ports, are provided along the length of the flow duct, for directing the pressurized liquid radially outward through the filter media, thereby expelling contaminants. The cleaning process is accomplished at relatively small expense. Additionally, the filter cleaning apparatus is relatively easy to use and operate.

In summary, and in accordance with the above discussion, the foregoing objectives are achieved in the following embodiments.

1. A mechanism for cleaning a filter cartridge, wherein the filter cartridge comprises, an annular filter body, having two opposing end caps, an inner annular surface, and an outer annular surface; said cleaning mechanism, comprising, an elongated tubular flow duct, having a number of ports, located at spaced points therealong; said flow duct, having a first closed end, and a second open end; said first closed end, being externally threaded; a first annular disk, having internal threads matable with the external threads on said flow duct, whereby said first annular disk can be screwed into said first end of said flow duct; a second annular disk affixed to said flow duct, near its second end; a hose coupling having a swivel fit on said second end of said flow duct, whereby a hose can be connected to said flow duct to deliver a pressurized stream of liquid into said flow duct; said flow duct and said annular disk, being manually positionable as a unit, so that an annular filter body can be telescoped onto said tubular flow duct, after which said first annular disk can be threaded onto said flow duct, to cause said annular disks to exert clamping pressure on the end caps of said filter body; and the external diameter of said flow duct being less than the corresponding diameter of the inner annular surface on said filter body, so that when the filter body is telescoped onto said flow duct, pressurized liquid can flow outwardly from said flow duct, through the filter body, thereby forcing contaminants from said filter body through the outer annular surface of said filter body.

2. The filter cartridge cleaning mechanism, as described in paragraph 1, wherein said annular disks have circular outer edges; each disk having the same diameter; and said diameter of each disk being only slightly greater than the diameter of the end caps on said filter body.

3. The filter cartridge cleaning mechanism, as described in paragraph 2, and further comprising, a container having two axially-shaped wall sections engageable with the outer edges of the circular disks when the flow duct-disk assembly is inserted into the container; and said container being adapted to surround said annular filter body on said flow duct, to exert a back pressure on liquid flowing from said flow duct through said filter body.

4. The filter cartridge cleaning mechanism, as described in paragraph 1, wherein each annular disk has a first clamp surface with an end cap of a filter body, and a second free surface, facing away from the filter body; and each clamp surface having an annular counterbore, concentric with the disk axis, whereby each clamp surface engages an end cap of the filter body radially outward beyond the filter body inner surface.

A BRIEF DESCRIPTION OF THE DRAWINGS

DESCRIPTION OF THE PREFERRED EMBODIMENTS OF THE PRESENT INVENTION

Figure 1:
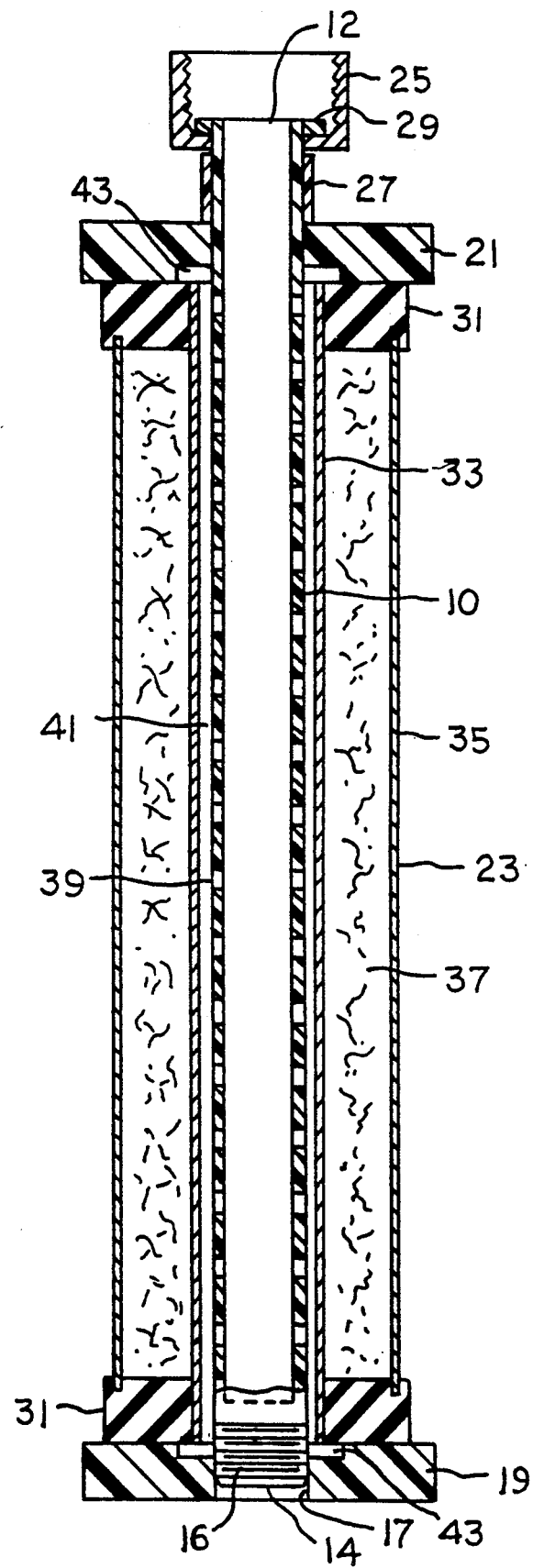
FIG. 1, is a cross-sectional view, taken through a filter cartridge cleaning mechanism, embodying the features of the present invention. A conventional filter cartridge is shown mounted on the filter cleaning mechanism.

FIG. 1, is a cross-sectional view, taken through a filter cartridge cleaning mechanism, embodying the features of the present invention. A conventional filter cartridge is shown mounted on the filter cleaning mechanism.

FIG. 1, shows a filter cartridge cleaning mechanism that comprises an elongated tubular flow duct 10, having an open upper end 12, and a closed lower end 14. The flow duct lower end 14, is externally threaded, as at 16, to threadably mesh with threads formed on the surface of a through hole 17, in a circular disk 19.

Near its upper end, flow duct 10, carries a second circular disk 21, said second disk 21, being permanently affixed to duct 10, by a suitable adhesive. The axial space between the two circular disks, 19 and 21, is adapted to accommodate an annular filter cartridge body, designated generally by numeral 23.

A hose coupling 25, has a swivel fit on the upper end of flow duct 10, whereby a conventional hose (not shown) can be screwed into the coupling for delivering a pressurized stream of liquid into the flow duct 10. Hose coupling 25, can be attached to flow duct 10, in various ways. As shown in the drawing, the radial wall of the hose coupling 25, fits in flow duct 10, between a tubular spacer 27, and a radial plate 29, said radial plate 29, being adhesively attached to the end of flow duct 10, to captively retain hose coupling 25, on the flow duct 10. The hose coupling 25, is free to swivel around the flow duct 10 axis. A sealing washer (not shown) can be positioned against radial plate 29, to prevent water leakage at the hose-duct connection point, i.e., joint.

Filter cartridge 23, is a known commercial construction, used in well water pumping and filtration systems. Typically, the filter cartridge 23, has an axial length of about ten (10) inches and a diameter of about two and one-half (2 ½) inches. The filter cartridge 23, comprises two similarly dimensioned rubber end caps 31, located at opposite ends of two concentric elongated annular walls, 33 and 35. Each annular wall, 33 and 35, is perforated along its axial length, for accommodating a radial flow of water through porous filtration media 37, located between annular walls 33 and 35. The filtration media 37, can be a length of porous felt material, or other media material, wrapped around inner annular wall 33, in spiral fashion. Annular wall 33, serves as a mandrel, for winding the filtration media 37 material, therearound. Annular wall 35, serves as an annular retainer, to prevent the filtration media 37, from separating from wall 33.

When the filter cartridge 23, is placed in service in a well filtration system, the direction of water flow through the filter cartridge 23, will be radial and inward. The water will flow into the filter cartridge 23, through the perforations in annular wall 35, and it will flow out of the filter cartridge 23, through the perforations in annular wall 33.

Tubular duct 10, has a number of flow ports 39, located at spaced intervals along the flow duct length. Also, the diameter of flow duct 10, is somewhat smaller than the inside diameter of filter cartridge wall 33, such that an annular space 41, is formed along the inner surface of annular wall 33. Pressurized water, or other cleaning solution, discharged from flow duct 10 through flow ports 39, is free to flow from annular space 41, through each of the perforations in annular wall 33, without being obstructed by the solid areas of annular wall 33.

The filter cartridge 23, is installed on the filter cartridge cleaning mechanism with circular disk 19, disconnected from flow duct 10. Disk 19, is then threaded onto the end of flow duct 10, in order to cause the two disks 19 and 21, to exert clamping pressure on the end caps 31, of the filter body. The circular disks, 19 and 21, have sealing engagement with rubber end caps 31, such that pressurized water supplied to duct 10, via hose coupling 25, is prevented from leaking across the joints between the circular disks, 19 and 21, and the end caps 31.

The clamp surface of each disk 19 or 21, has a counterbore 43, concentric with the disk axis, such that the disk area in axial alignment with cartridge inner wall 33, is spaced away from the associated rubber end cap 31. Disks 19 and 21, engage the rubber end caps 31, radially outward beyond the inner wall 33, of the filter cartridge 23, such that the clamp pressure has a lessened tendency to buckle, or deform, annular wall 33. The rubber end caps 31, can deform slightly, without transmitting any appreciable force to wall 33.

Prior to coupling flow duct 10, to the water supply hose, a quantity of detergent, or other cleaning agent, e.g., bleach can be poured into duct 10. During this process, the flow duct will be oriented away in an upright position, as shown in FIG. 1.

During the cleaning operation, pressurized water is supplied to the upper end of flow duct 10, with the flow duct preferably being held in a vertical position. The cleaning liquid flows radially outwardly through the filtration media 37, to expel contaminants from the pores of the filtration media. With a reasonably high water pressure, the liquid will flow through the relatively dense and porous media 37, and then gravitate downwardly along the outer surface of annular wall 35. There is ordinarily no spray or airborne movement horizontally away from annular wall 35.

A major portion of the filtration media axial length can be cleaned of contaminants. However, a portion of the filtration media 37, near the upper disk 21, may not have been fully cleaned. In order to fully clean the entire axial length of the filtration media, the filter cartridge 23, can be reversed end-for-end. This involves unthreading the lower disk 19, reversing the filtration cartridge 23, end-for-end on flow duct 10, and rethreading disk 19, on the lower end of the flow duct 10. When a new supply of liquid is then admitted to flow duct 10, through hose coupling 25, the filter cartridge will then become cleaned at both ends.

Figure 2:
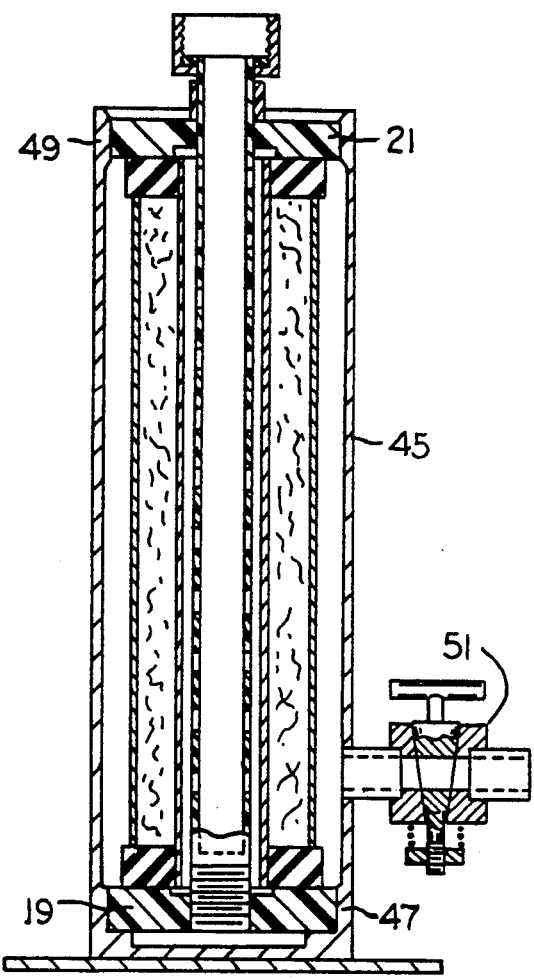
FIG. 2, is a view, taken in the same direction as FIG. 1, but showing the filter cartridge cleaning mechanism inserted into a container, for achieving an additional cleaning action on the filter cartridge.

FIG. 2, is a view, taken in the same direction as FIG. 1, but showing the filter cartridge cleaning mechanism inserted into a container, for achieving an additional cleaning action on the filter cartridge.

FIG. 2, illustrates an apparatus that can be used in conjunction with the apparatus of FIG. 1. As shown in FIG. 2, the filter cartridge cleaning mechanism is inserted downwardly into an upright container 45, that has two axially spaced wall sections, 47 and 49, engageable with the outer edges of circular disks 19 and 21. The container 45, is provided with a manual valve 51, that can be partially closed to slightly restrict the flow of liquid out of the container 45.

With the filter cartridge cleaning mechanism inserted into container 45, and valve 51, partially closed, the liquid surrounding the filter cartridge 23, will exert a slight back pressure on the liquid flowing through the filtration media 37, such that the flow will be essentially equalized along the axial length of the filter cartridge 23. It is believed, that by using the container 45, it is possible to avoid having to reverse the filter cartridge end-for-end, in order to effectively clean the entire length of the filter cartridge.

Figure 3:
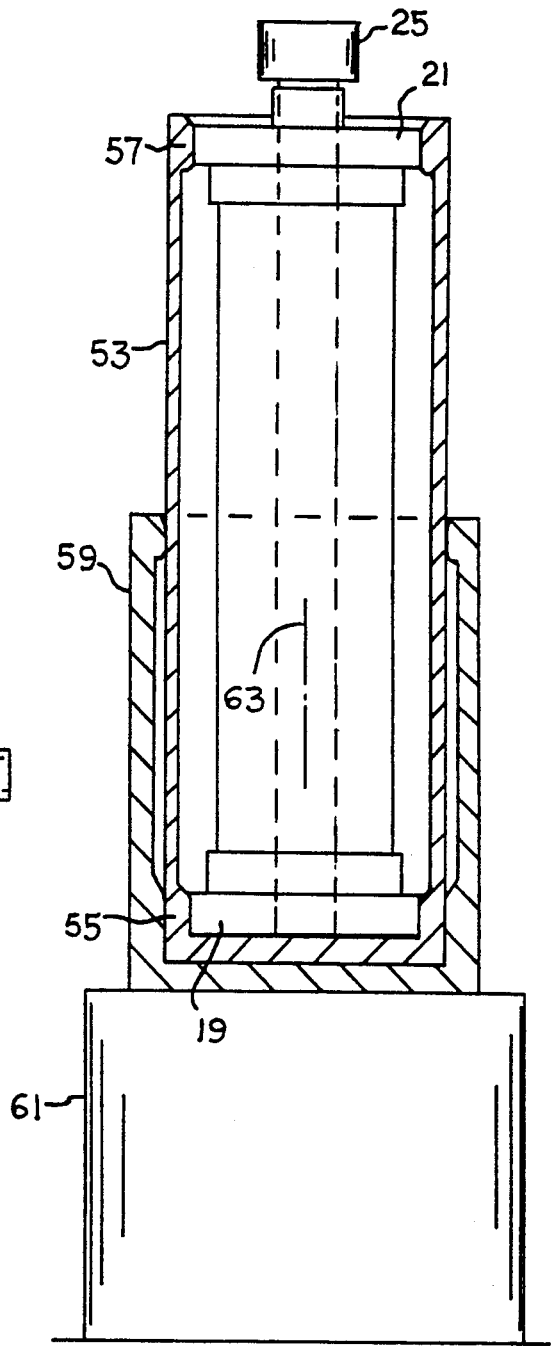
FIG. 3, is a view, taken in the same direction as FIG. 1, but showing the filter cartridge cleaning mechanism in a different operational mode.

FIG. 3, is a view, taken in the same direction as FIG. 1, but showing the filter cartridge cleaning mechanism in a different operational mode.

FIG. 3, illustrates another apparatus that could be used with the FIG. 1, cleaning mechanism, to achieve a centrifugal cleaning action. The apparatus, comprises a container 53, having spaced wall sections 55 and 57, engageable with the edges of circular disks 19 and 21. The container is removably supported in a socket structure 59, that is rotatably mounted on a base 61. An electric motor (not shown), in the base, has its drive shaft (not shown), connected to socket structure 59, so that when the motor is energized, the container 53, and the filter cartridge cleaning mechanism, are rotated around a central vertical axis 63.

After the filter cartridge cleaning mechanism has been filled with liquid, the hose can be disconnected from hose coupling 25. The electric motor can then be energized, to rotate the associated cleaning mechanism, thereby causing contaminants in the filter cartridge 23, to be thrown outward, beyond the filter cartridge outer surface.

FIGS. 2 and 3, are intended show various ways in which the filter cartridge cleaning mechanism can be used. The present invention is primarily concerned with the construction of the filter cartridge cleaning mechanism, as depicted in FIG. 1. The filter cartridge cleaning mechanism, is constructable at relatively low cost. The filter cartridge cleaning mechanism is easily and quickly attached to a conventional filter cartridge, or detached from a filter cartridge, without special tools or equipment. A principal feature of this invention is the relative simplicity of the filter cartridge cleaning mechanism.

The present invention describes a filter cleaning mechanism for use with filter cartridges used in water wells. Features of the present invention are recited in the appended claims. The drawings contained herein necessarily depict structural features and embodiments of the filter cleaning mechanism, useful in the practice of the present invention.

However, it will be appreciated by those skilled in the arts pertaining thereto, that the present invention can be practiced in various alternate forms and configurations. Further, the previously detailed descriptions of the preferred embodiments of the present invention, are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

What is claimed is:

1. A mechanism for cleaning a filter cartridge, wherein the filter cartridge comprises, an annular filter body, having two opposing end caps, an inner annular surface, and an outer annular surface; said cleaning mechanism, comprising, an elongated tubular flow duct, having a number of ports, located at spaced points therealong; said flow duct having a first closed end, and a second open end; said first closed end, being externally threaded; a first annular disk, having internal threads matable with the external threads on said flow duct, whereby said first annular disk can be screwed onto said first end of said flow duct; a second annular disk affixed to said flow duct, near its second end; a hose coupling having a swivel fit on said second end of said flow duct, whereby a hose can be connected to said flow duct to deliver a pressurized stream of liquid into said flow duct; said flow duct and said annular disks, being manually positionable as a unit, so that an annular filter body can be telescoped onto said tubular flow duct, after which said first annular disk can be threaded onto said flow duct, to cause said annular disks to exert clamping pressure on the end caps of said filter body; and the external diameter of said flow duct being less than the corresponding diameter of the inner annular surface on said filter body, so that when the filter body is telescoped onto the flow duct, pressurized liquid can flow outwardly from said flow duct, through the filter body, thereby forcing contaminants from said filter body through the outer annular surface of said filter body.

2. The filter cartridge cleaning mechanism, as described in claim 1, wherein said annular disks have circular outer edges; each disk having the same diameter; and said diameter of each disk being only slightly greater than the diameter of the end caps on said filter body.

3. The filter cartridge cleaning mechanism, as described in claim 2, and further comprising, a container having two axially-shaped wall sections engageable with the outer edges of the circular disks when the flow duct-disk assembly is inserted into the container; and said container being adapted to surround said annular filter body on said flow duct, to exert a back pressure on liquid flowing from said flow duct through said filter body.

4. The filter cartridge cleaning mechanism, as described in claim 1, wherein each annular disk has a first clamp surface with an end cap of a filter body, and a second free surface, facing away from the filter body; and each clamp surface having an annular counterbore, concentric with the disk axis, whereby each clamp surface engages an end cap of the filter body radially outward beyond the filter body inner surface.

* * * * *